United States Patent
Kim et al.

(10) Patent No.: US 10,756,867 B2
(45) Date of Patent: Aug. 25, 2020

(54) METHOD AND APPARATUS FOR TRANSMITTING SIGNAL ON BASIS OF CONTENTION-BASED NON-ORTHOGONAL MULTIPLE ACCESS SCHEME

(71) Applicant: LG Electronics Inc., Seoul (KR)

(72) Inventors: Myeongjin Kim, Seoul (KR); Sangrim Lee, Seoul (KR); Hojae Lee, Seoul (KR); Dongkyu Kim, Seoul (KR); Kwangseok Noh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/344,228

(22) PCT Filed: May 8, 2017

(86) PCT No.: PCT/KR2017/004734
§ 371 (c)(1),
(2) Date: Apr. 23, 2019

(87) PCT Pub. No.: WO2018/074688
PCT Pub. Date: Apr. 26, 2018

(65) Prior Publication Data
US 2019/0245664 A1 Aug. 8, 2019

Related U.S. Application Data

(60) Provisional application No. 62/411,685, filed on Oct. 23, 2016.

(51) Int. Cl.
*H04L 5/00* (2006.01)
*H04W 72/04* (2009.01)
(Continued)

(52) U.S. Cl.
CPC .............. *H04L 5/0048* (2013.01); *H04L 5/00* (2013.01); *H04L 27/26* (2013.01); *H04W 8/18* (2013.01); *H04W 72/04* (2013.01); *H04W 88/02* (2013.01)

(58) Field of Classification Search
CPC ......... H04L 5/0048; H04L 5/00; H04L 27/25; H04W 8/18; H04W 72/04; H04W 88/02
See application file for complete search history.

(56) References Cited

U.S. PATENT DOCUMENTS

2017/0367110 A1* 12/2017 Li ........................... H04W 4/70

FOREIGN PATENT DOCUMENTS

| WO | WO2016029835 | 3/2016 |
| WO | WO2016153555 | 9/2016 |

OTHER PUBLICATIONS

PCT Written Opinion issued in International Application No. PCT/KR2017/004734, dated Aug. 11, 2017, 17 pages.
(Continued)

*Primary Examiner* — Melvin C Marcelo
(74) *Attorney, Agent, or Firm* — Fish & Richardson P.C.

(57) ABSTRACT

According to one embodiment, a method by which a terminal transmits a signal in a wireless communication system on the basis of a contention-based non-orthogonal NOMA scheme can be provided, wherein the method for transmitting the signal can comprise the steps of: allocating a resource pool to which a signal is to be transmitted on the basis of the contention-based NOMA scheme; and transmitting data and a UE ID through the resource pool on the basis of the contention-based NOMA scheme, wherein a plurality of UE ID regions exist in the resource pool, and the UE ID can be allocated to a first region, which is one of the plurality of UE ID regions, and then transmitted.

15 Claims, 13 Drawing Sheets

(51) Int. Cl.
*H04W 8/18* (2009.01)
*H04L 27/26* (2006.01)
*H04W 88/02* (2009.01)

(56) References Cited

OTHER PUBLICATIONS

LG Electronics, "Considerations on contention based MA," R1-166877, 3GPP TSG RAN WG1 Meeting #86, Gothenburg, Sweden, Aug. 22-26, 2016, 3 pages.
CATT, "Consideration on grant-free transmission," R1-1608757, 3GPP TSG RAN WG1 Meeting #86bis, Lisbon, Portugal Oct. 10-14, 2016, 2 pages.
Intel Corporation, "Grant-free UL transmissions in NR," R1-1609499, 3GPP TSG-RAN WG1 #86bis, Lisbon, Portugal, Oct. 10-14, 2016, 8 pages.

* cited by examiner

FIG. 9
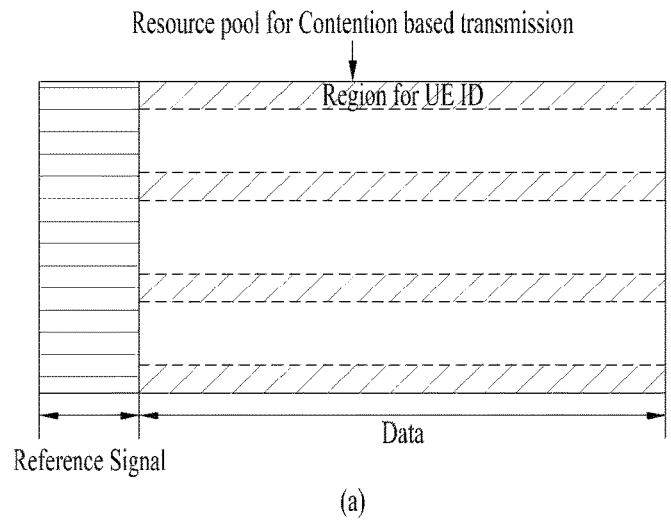
(a)
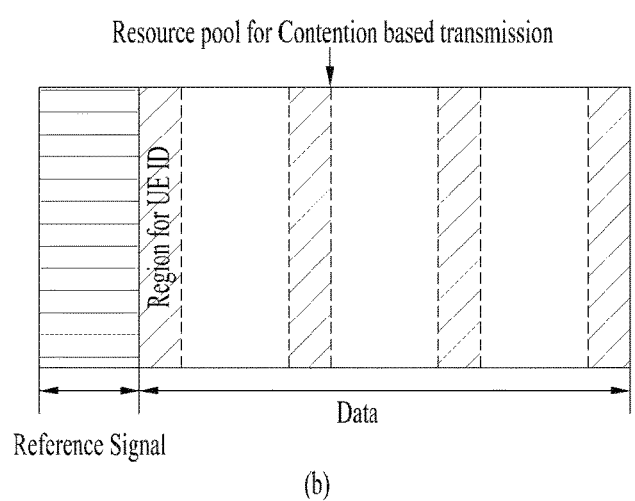
(b)
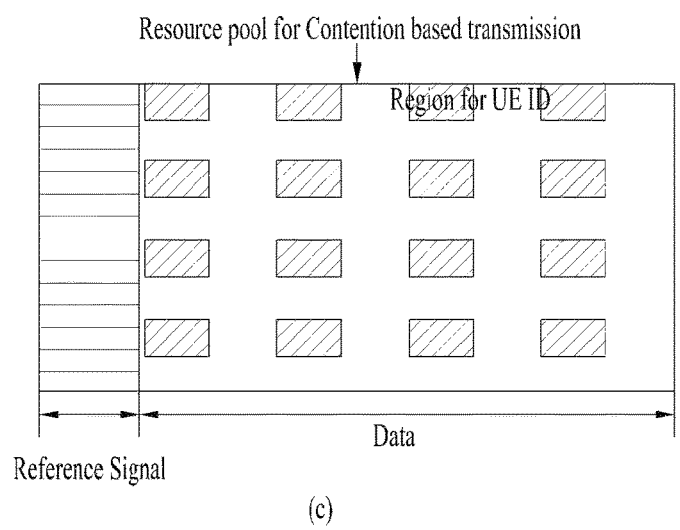
(c)

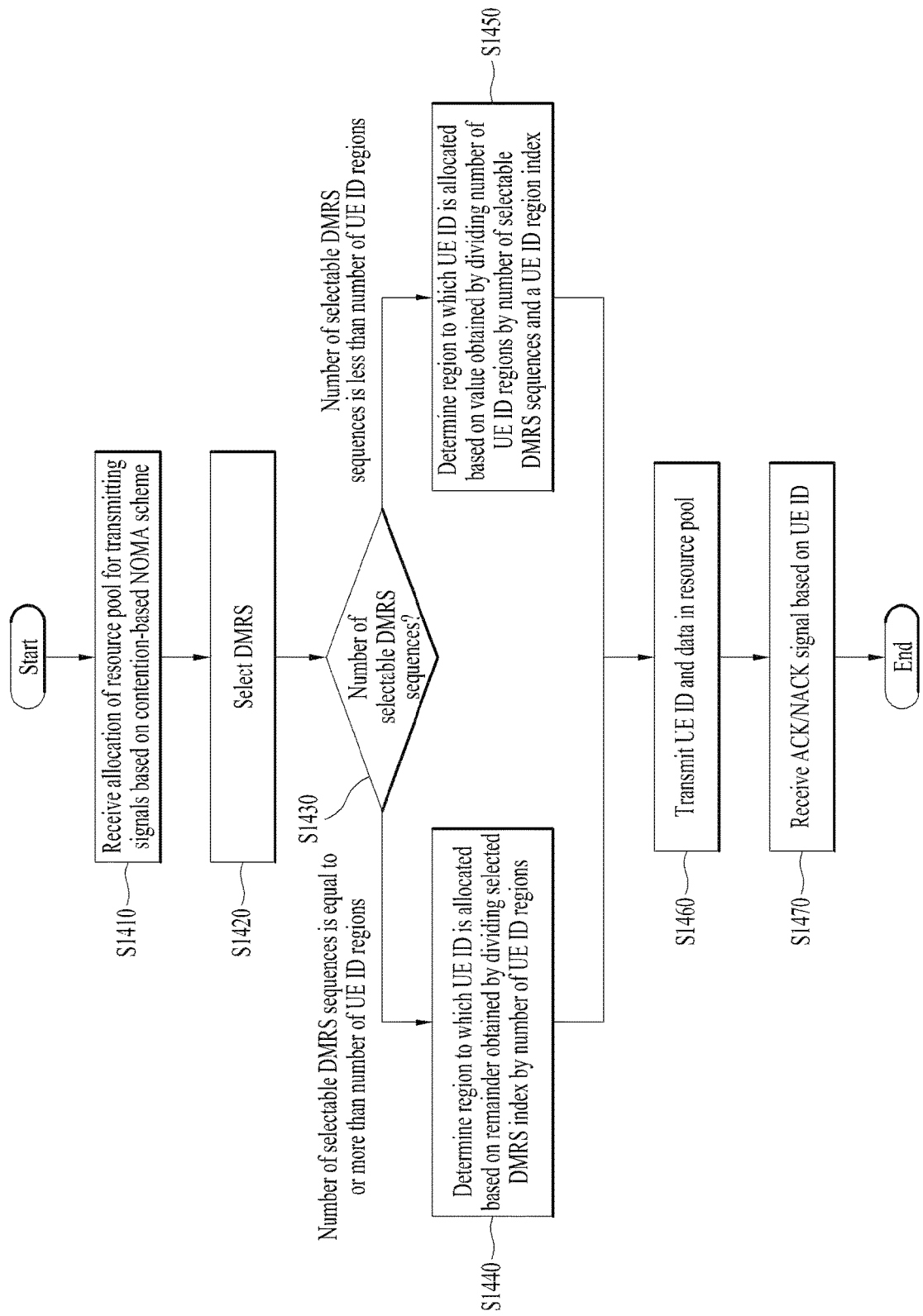

METHOD AND APPARATUS FOR TRANSMITTING SIGNAL ON BASIS OF CONTENTION-BASED NON-ORTHOGONAL MULTIPLE ACCESS SCHEME

CROSS-REFERENCE TO RELATED APPLICATIONS

This application is a National Stage application under 35 U.S.C. § 371 of International Application No. PCT/KR2017/004734, filed on May 8, 2017, which claims the benefit of U.S. Provisional Application No. 62/411,685, filed on Oct. 23, 2016. The disclosures of the prior applications are incorporated by reference in their entirety.

TECHNICAL FIELD

The present disclosure relates to a wireless communication system, and more particularly, to a method and device for transmitting a signal based on a contention-based Non-Orthogonal Multiple Access (NOMA) scheme.

BACKGROUND ART

Wireless communication systems have been widely deployed to provide various types of communication services such as voice, data, etc. In general, the wireless communication system corresponds to a multiple access system that can support communication between multiple users by sharing available system resources (e.g., bandwidth, transmission power, etc.). The multiple access system can be categorized into Orthogonal Multiple Access (OMA) and Non-Orthogonal Multiple Access (NOMA) depending on whether orthogonality is guaranteed. For example, the multiple access system includes a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, etc.

Meanwhile, the 3rd Generation Partnership Project Long Term Evolution (3GPP LTE) system was designed to have a frame structure with a Transmission Time Interval (TTI) of 1 ms, and the data delay time for a video application was 10 ms. However, the next-generation 5G technology requires data transmission with much lower latency due to the appearance of new applications such as real-time control and the Tactile Internet. Specifically, it is expected that 5G data delay will decrease to 1 ms. Moreover, the next-generation 5G technology requires that more terminals are connected to one base station. Specifically, it is expected that 5G connectivity will increase to a maximum of 1,000,000/km$^2$.

DISCLOSURE OF THE INVENTION

Technical Task

An object of the present disclosure is to provide a method by which a terminal transmits a signal based on a NOMA scheme in a wireless communication system.

Another object of the present disclosure is to provide a method by which a User Equipment (UE) transmits UE ID information based on a contention-based NOMA scheme in a wireless communication system.

Still another object of the present disclosure is to provide a transmission method capable of reducing latency and overhead in a wireless communication system.

A further object of the present disclosure is to provide a method of allocating resources for a UE ID in a contention-based NOMA scheme.

Technical Solution

In an aspect of the present disclosure, provided is a method of transmitting a signal by a User Equipment (UE) based on a contention-based Non-Orthogonal Multiple Access (NOMA) scheme in a wireless communication system. The signal transmission method may include: receiving allocation of a resource pool for transmitting signals based on the contention-based NOMA scheme; and transmitting data and a UE ID in the resource pool based on the contention-based NOMA scheme. In this case, there may be a plurality of UE ID regions in the resource pool, and the UE ID may be allocated to a first region, which is one of the plurality of UE ID regions, and then transmitted.

In another aspect of the present disclosure, provided is a User Equipment (UE) for transmitting a signal based on a contention-based Non-Orthogonal Multiple Access (NOMA) scheme in a wireless communication system. The UE may include: a receiving module configured to receive a signal; a transmitting module configured to transmit a signal; and a processor configured to control the receiving module and the transmitting module. The processor may be configured to receive allocation of a resource pool for transmitting signals based on the contention-based NOMA scheme and transmit data and a UE ID in the resource pool based on the contention-based NOMA scheme using the transmitting module. In this case, there may be a plurality of UE ID regions in the resource pool, and the UE ID may be allocated to a first region, which is one of the plurality of UE ID regions, and then transmitted.

The following descriptions can be commonly applied to the method and device for transmitting a signal based on a contention-based NOMA scheme in a wireless communication system.

According to an embodiment of the present disclosure, the first region to which the UE ID is allocated may be determined based on a Demodulation Reference Signal (DMRS).

According to an embodiment of the present disclosure, the first region to which the UE ID is allocated may be determined based on the number of DMRS sequences and the number of UE ID regions.

According to an embodiment of the present disclosure, when the number of DMRS sequences is equal to or greater than the number of UE ID regions, the first region to which the UE ID is allocated among the plurality of UE ID regions may be determined based on a remainder obtained by dividing a selected DMRS index by the number of UE ID regions.

According to an embodiment of the present disclosure, when the number of DMRS sequences is smaller than the number of UE ID regions, the first region to which the UE ID is allocated among the plurality of UE ID regions may be determined based on a value obtained by dividing the number of UE ID regions by the number of DMRS sequences and a UE ID region index.

According to an embodiment of the present disclosure, the first region to which the UE ID is allocated may have a higher priority than a region in which the data is transmitted within the resource pool.

According to an embodiment of the present disclosure, when the first region has the higher priority, the first region may be transmitted at higher power than other regions within the resource pool.

According to an embodiment of the present disclosure, when the first region has the higher priority, the first region may be transmitted with a lower coding rate than other regions within the resource pool.

According to an embodiment of the present disclosure, a certain region to which the UE ID is allocated may be determined based on a Cell Radio-Network Temporary Identifier (C-RNTI).

According to an embodiment of the present disclosure, the plurality of UE ID regions may be configured in parallel to a time axis within the resource pool or in parallel to a frequency axis within the resource pool.

Advantageous Effects

The present disclosure can provide a method by which a UE transmits a signal based on a NOMA scheme in a wireless communication system.

The present disclosure can provide a method by which a UE transmits UE ID information based on a contention-based NOMA scheme.

The present disclosure can provide a transmission method capable of reducing latency and overhead in a wireless communication system.

The present disclosure can provide a method of allocating resources for a UE ID in a contention-based NOMA scheme.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 9 is a diagram illustrating a method of configuring a resource region for UE ID transmission within a resource pool;

FIG. 14 is a flowchart illustrating a method of configuring a UE ID allocation region based on a DMRS in the contention-based NOMA scheme.

BEST MODE FOR INVENTION

Figure 1:
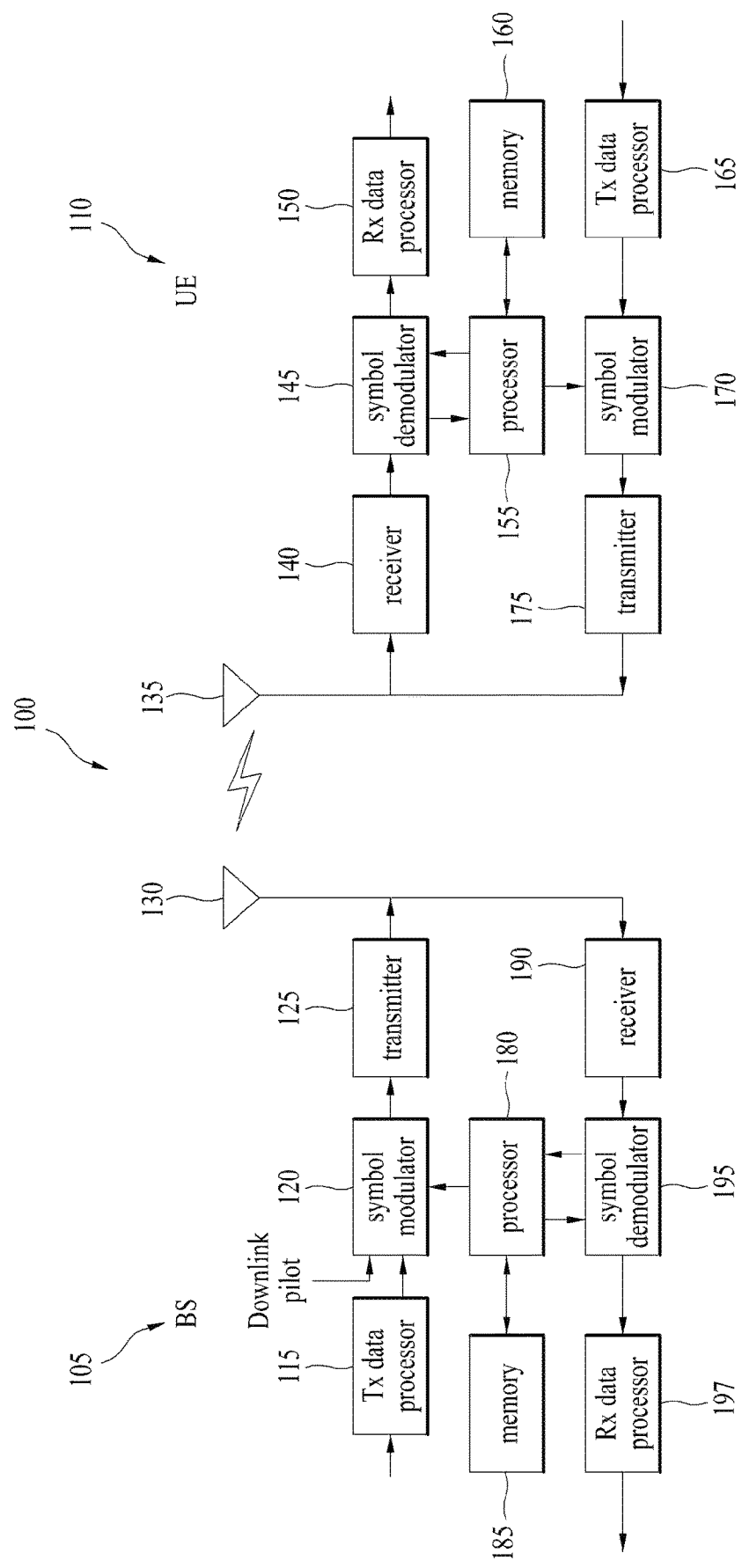
FIG. 1 is a block diagram illustrating the configurations of a base station 105 and a user equipment 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. However, it is apparent to those skilled in the art that the present disclosure can be implemented without these details. For instance, although the following descriptions are made in detail on the assumption that a mobile communication system is the 3GPP LTE system or LTE-A system, the following descriptions are applicable to other random mobile communication systems by excluding unique features of the 3GPP LTE and LTE-A systems.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. In addition, assume that a base station (BS) is a common name of such a random node of a network stage communicating with a terminal as a Node B (NB), an eNode B (eNB), an access point (AP) and the like.

In a mobile communication system, a UE can receive information from a BS in downlink and transmit information in uplink. The UE can transmit or receive various data and control information and use various physical channels depending types and uses of information transmitted or received thereby.

The following descriptions are applicable to various wireless access systems including a CDMA system, an FDMA system, a TDMA system, an OFDMA system, an SC-FDMA system, etc. CDMA can be implemented by radio technology such as Universal Terrestrial Radio Access (UTRA), CDMA 2000, etc. TDMA can be implemented with radio technology such as Global System for Mobile communications/General Packet Radio Service/Enhanced Data Rates for GSM Evolution (GSM/GPRS/EDGE). OFDMA can be implemented with radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS).

3GPP LTE is a part of Evolved UMTS (E-UMTS) using E-UTRA. The 3GPP LTE employs OFDMA in downlink and SC-FDMA in uplink. In addition, LTE-Advanced (LTE-A) is an evolved version of the 3GPP LTE.

Moreover, in the following description, specific terminologies are provided to help the understanding of the present disclosure. In addition, the use of the specific terminology can be modified into another form within the scope of the technical idea of the present disclosure.

Regarding wireless transmission between a BS and a UE, transmission from a BS to a UE is defined as downlink transmission, and transmission from a UE to a BS is defined as uplink transmission. A mode where radio resources for downlink transmission are different from those for uplink transmission is referred to as 'duplex mode'. In particular, a mode of performing transmission and reception bidirectionally by dividing time resources into downlink transmission time resources and uplink transmission time resources is referred to as 'Time Division Duplex (TDD) mode', and a mode of performing transmission and reception bidirectionally by dividing frequency bands into downlink transmission bands and uplink transmission bands is referred to as 'Frequency Division Duplex (FDD) mode'. It is apparent that the technology proposed in the present disclosure may operate not only in the FDD mode but also in the TDD mode.

FIG. 1 is a block diagram illustrating configurations of a BS 105 and a UE 110 in a wireless communication system 100.

Although one BS 105 and one UE 110 are shown in the drawing to schematically represent the wireless communication system 100, the wireless communication system 100 may include at least one BSn and/or at least one UE.

Referring to FIG. 1, the BS 105 may include a Transmission (Tx) data processor 115, a symbol modulator 120, a transmitter 125, a transmitting and receiving antenna 130, a processor 180, a memory 185, a receiver 190, a symbol demodulator 195, and a Reception (Rx) data processor 197.

The UE 110 may include a Transmission (Tx) data processor 165, a symbol modulator 170, a transmitter 175, a transmitting and receiving antenna 135, a processor 155, a memory 160, a receiver 140, a symbol demodulator 155, and a Reception (Rx) data processor 150. Although FIG. 1 shows that the BS 105 uses one transmitting and receiving antenna 130 and the UE 110 uses one transmitting and receiving antenna 135, each of the BS 105 and the UE 110 may include a plurality of antennas. Therefore, each of the BS 105 and the UE 110 according to the present disclosure can support the Multi-Input Multi-Output (MIMO) system. In addition, the BS 105 according to the present disclosure can also support both of the Single User-MIMO (SU-MIMO) system and the Multi-User-MIMO (MU-MIMO) system.

For downlink transmission, the Tx data processor 115 receives traffic data, formats the received traffic data, codes the formatted traffic data, interleaves and modulates (or perform symbol mapping on) the coded traffic data, and provides modulated symbols (data symbols). The symbol modulator 120 provides a stream of symbols by receiving and processing the data symbols and pilot symbols.

The symbol modulator 120 performs multiplexing of the data and pilot symbols and transmits the multiplexed symbols to the transmitter 125. In this case, each of the transmitted symbols may be a data symbol, a pilot symbol or a zero value signal. In each symbol period, pilot symbols may be continuously transmitted. In this case, each of the pilot symbols may be a Frequency Division Multiplexing (FDM) symbol, an Orthogonal Frequency Division Multiplexing (OFDM) symbol, or a Code Division Multiplexing (CDM) symbol.

The transmitter 125 receives the symbol stream, converts the received symbol stream into one or more analog signals, adjusts the analog signals (e.g., amplification, filtering, frequency upconverting, etc.), and generates a downlink signal suitable for transmission on a radio channel. Thereafter, the transmitting antenna 130 transmits the downlink signal to the UE.

Hereinafter, the configuration of the UE 110 is described. The receiving antenna 135 receives the downlink signal from the BS and forwards the received signal to the receiver 140. The receiver 140 adjusts the received signal (e.g., filtering, amplification, frequency downconverting, etc.) and obtains samples by digitizing the adjusted signal. The symbol demodulator 145 demodulates the received pilot symbols and forwards the demodulated pilot symbols to the processor 155 for channel estimation.

The symbol demodulator 145 receives a frequency response estimation value for downlink from the processor 155, performs data demodulation on the received data symbols, obtains data symbol estimation values (i.e., estimation values of transmitted data symbols), and provides the data symbols estimation values to the Rx data processor 150. The Rx data processor 150 reconstructs the transmitted traffic data by demodulating (i.e., performing symbol demapping on), deinterleaving and decoding the data symbol estimated values. The processing performed by the symbol demodulator 145 and the Rx data processor 150 are complementary to that performed by the symbol modulator 120 and the transmission data processor 115 of the BS 105, respectively.

For uplink transmission, the Tx data processor 165 of the UE 110 processes the traffic data and provides data symbols. The symbol modulator 170 receives the data symbols, performs multiplexing of the received data symbols, modulates the multiplexed symbols, and provides a stream of symbols to the transmitter 175. The transmitter 175 receives the symbol stream, processes the received stream, and generates an uplink signal. The transmitting antenna 135 transmits the generated uplink signal to the BS 105.

The BS 105 receives the uplink signal from the UE 110 through the receiving antenna 130. The receiver 190 obtains samples by processing the received uplink signal. Subsequently, the symbol demodulator 195 processes the samples and provides pilot symbols received in uplink and data symbol estimation values. The Rx data processor 197 reconstructs the traffic data transmitted from the UE 110 by processing the data symbol estimation values.

The processor 155 of the UE 110 controls operations (e.g., control, adjustment, management, etc.) of the UE 110, and the processor 180 of the BS 105 controls operations (e.g., control, adjustment, management, etc.) of the BS 105. The processors 155 and 180 may be connected to the memory units 160 and 185 configured to store program codes and data, respectively. Specifically, the memory units 160 and 185, which are connected to the processors 155 and 180, respectively, store operating systems, applications, and general files.

Each of the processors 155 and 180 can be called a controller, a microcontroller, a microprocessor, a microcomputer or the like. In addition, the processors 155 and 180 can be implemented using hardware, firmware, software and/or any combinations thereof.

When the embodiments of the present disclosure are implemented using hardware, the processors 155 and 180 may be provided with Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc.

Meanwhile, when the embodiments of the present disclosure are implemented using firmware or software, the firmware or software may be configured to include modules, procedures, and/or functions for performing the above-explained functions or operations of the present disclosure. In addition, the firmware or software configured to implement the present disclosure is provided within the processors 155 and 180. Alternatively, the firmware or software may be saved in the memories 160 and 185 and then driven by the processors 155 and 180.

Radio protocol layers between a UE and a BS in a wireless communication system (network) may be classified as Layer 1 (L1), Layer 2 (L2), and Layer 3 (L3) based on three lower layers of the Open System Interconnection (OSI) model well known in communication systems. A physical layer belongs to the L1 layer and provides an information transfer service via a physical channel. A Radio Resource Control (RRC) layer belongs to the L3 layer and provides control radio resources between a UE and a network. That is, a BS and a UE may exchange RRC messages through RRC layers in a wireless communication network.

In the present specification, since it is apparent that the UE processor 155 and the BS processor 180 are in charge of processing data and signals except transmission, reception, and storage functions, they are not mentioned specifically for convenience of description. In other words, even if the the processors 155 and 180 are not mentioned, a series of data processing operations except the transmission, reception, and storage functions can be assumed to be performed by the the processors 155 and 180.

Figure 2:
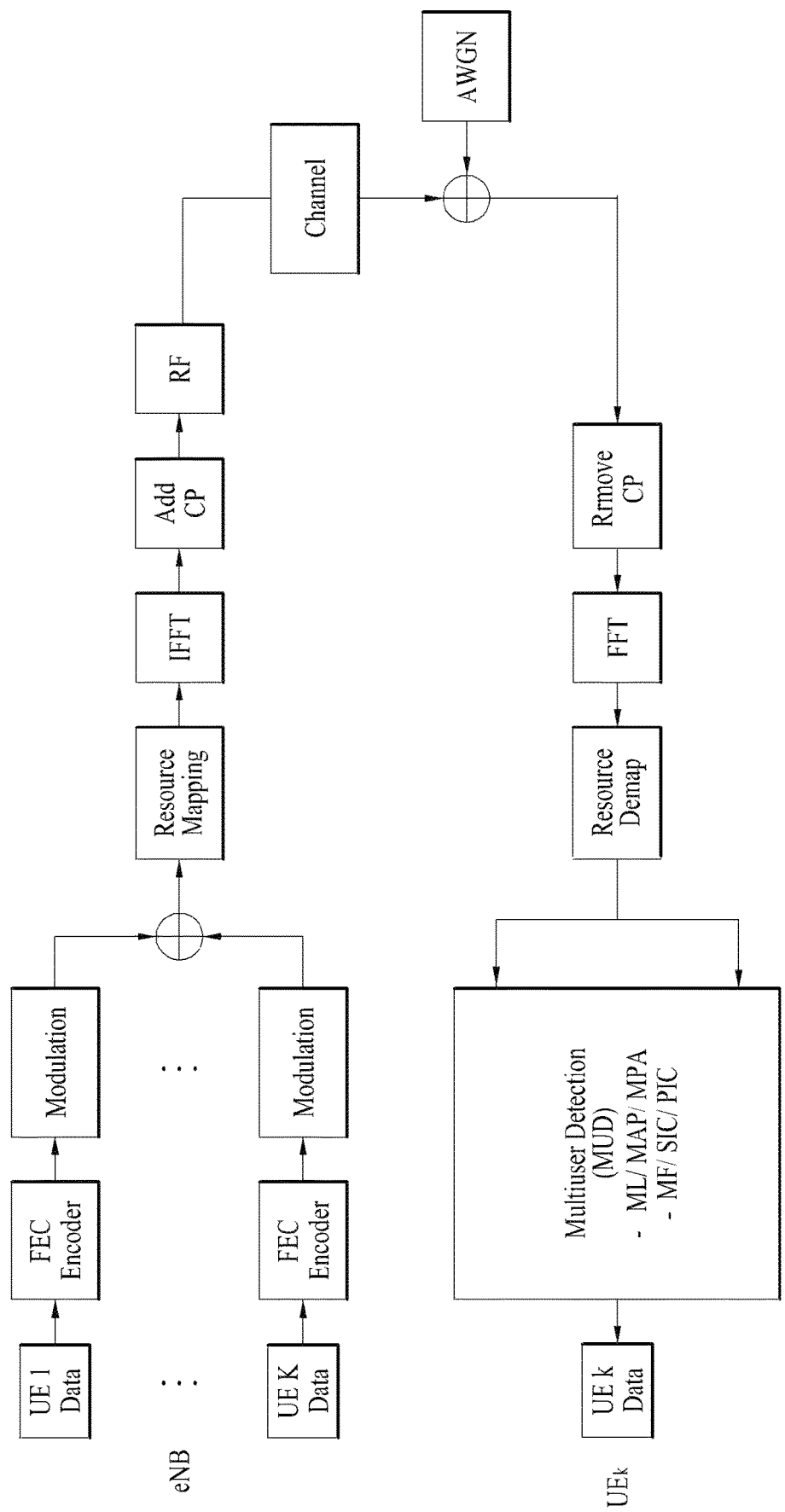
FIG. 2 is a block diagram illustrating NOMA-based downlink transmission/reception (Tx/Rx) of communication devices.

FIG. 2 is a block diagram illustrating NOMA-based downlink transmission/reception (Tx/Rx) of communication devices.

Specifically, FIG. 2 shows the structures of transmitting and receiving ends for downlink support in a NOMA system where information for multiple UEs (or users) is allocated to the same resource and transmitted thereon. In the 3GPP standardization, the NOMA system is referred to as 'Multiuser Superposition Transmission (MUST) system'. Since information for multiple UEs is superposed and transmitted on the same time-frequency resource in the NOMA system, it can guarantee high transmission capacity and increase the number of simultaneous accesses compared to the legacy LTE system. Thus, the NOMA system is considered as a core technology for the next generation 5G system. For example, the NOMA-based technology for the next-generation 5G system may include: MUST where UEs are identified based on their power levels; Sparse Code Multiple Access (SCMA) where modulation is performed based on a sparse complex codebook; and Interleave Division Multiple Access (IDMA) where a UE-specific interleaver is used.

Referring to FIG. 2, in the MUST system, a transmitting end modulates data for multiple UEs and then allocates different power to each symbol.

Alternatively, the transmitting end hierarchically modulates the data for the multiple UEs based on hierarchical modulation and then transmits the hierarchically modulated data. Meanwhile, a receiving end demodulates the data for the multiple UEs (hereinafter such data is referred to as multi-UE data) based on Multiuser Detection (MUD).

Referring to FIG. 2, in the SCMA system, the transmitting end replaces a Forward Error Correction (FEC) encoder and a modulation procedure for multi-UE data with a predetermined sparse complex codebook modulation scheme and then transmits the multi-UE data. The receiving end demodulates the multi-UE data based on MUD. Referring to FIG. 2, in the IDMA system, the transmitting end modulates and transmits FEC encoding information for multi-UE data using UE-specific interleavers, and the receiving end demodulates the multi-UE data based on MUD.

Each of the above systems may demodulate multi-UE data using various MUD schemes. For example, the MUD schemes may include Maximum Likelihood (ML), Maximum joint A posteriori Probability (MAP), Message Passing Algorithm (MPA), Matched Filtering (Mf), Successive Interference Cancellation (SIC), Parallel Interference Cancellation (PIC), Codeword Interference Cancellation (CWIC), etc. In this case, the demodulation complexity and processing time delay may vary depending on modulation schemes or the number of demodulation attempts.

Figure 3:
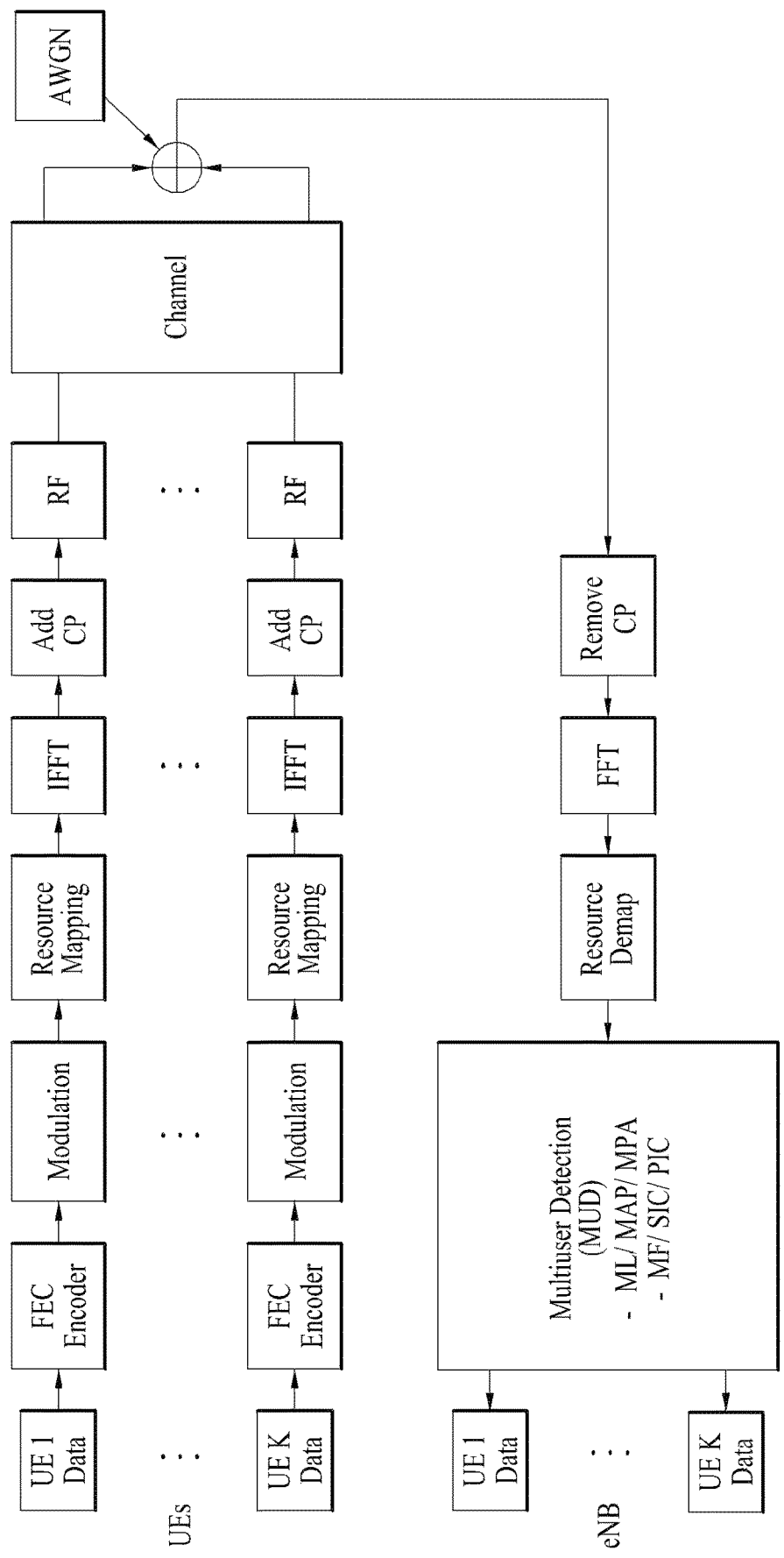
FIG. 3 is a block diagram illustrating NOMA-based uplink transmission/reception of communication devices.

FIG. 3 is a block diagram illustrating NOMA-based uplink transmission/reception of communication devices.

Specifically, FIG. 3 shows the structures of transmitting and receiving ends for uplink support in a NOMA-based system where information for multiple UEs (hereinafter such information is referred to as multi-UE information) is allocated to the same resource and transmitted thereon. In each system, a transmitting end of FIG. 3 may transmit multi-UE data in the same manner as described in FIG. 2, and a receiving end of FIG. 3 may demodulate the multi-UE in the same manner as described in FIG. 2. Since the NOMA-based system superposes and transmits signals for multiple UEs on the same time-frequency resource, it has a high decoding error rate compared to that of the LTE system but can support high frequency usage efficiency or large connectivity. In other words, the NOMA system can guarantee high frequency usage efficiency or large connectivity without any increase in the decoding error rate by controlling a coding rate according to system environments.

Compared to a case where data is allocated for a single UE, interference between multi-UE data is inevitable in the NOMA-based systems because the multi-UE data is allocated to the same resource. A signal at a kth receiving end in the NOMA-based system shown in FIG. 2 can be simply expressed as shown in Equation 1.

$$y_k = \sum_{n=1}^{K} h_k s_n + n_k = h_k s_k + \sum_{n \neq k, n=1}^{K} h_k s_n + n_k \quad \text{[Equation 1]}$$

In Equation 1, $h_k$ means a channel from the transmitting end to the kth receiving end, $s_k$ means a data symbol to the kth receiving end, and $n_k$ means signal noise. K is the number of multiple UEs allocated to the same time-frequency resource. The second term ($\Sigma_{n \neq k, n=1}^{K} h_k s_n$) of the third formula of Equation 1 indicates a Multiuser Interference (MUI) signal caused by data symbols to other receiving ends. Therefore, the transmission capacity according to the received signal can be simply expressed as shown in Equation 2 below.

$$C = \sum_{k=1}^{K} R_k \quad \text{[Equation 2]}$$

$$R_k = \log_2\left(1 + \frac{|h_k s_k|^2}{\left|\sum_{n \neq k, n=1}^{K} h_k s_n\right|^2 + \sigma_k}\right) =$$

$$\log_2\left(1 + \frac{\text{Channel Gain}}{MUI + \text{Noise}}\right), \forall k$$

Regarding the transmission capacity in Equation 2, since the number of added $R_k$ values increases as K increases, it is expected that C also increases. However, considering that MUI increases as K increases, each of the $R_k$ values decreases so that the entire transmission capacity C may decrease. Even if a MUD scheme can demodulate data for each UE while effectively decreasing the MUI, the presence of the MUI decreases the entire transmission capacity and requires high-complexity MUD. If the MUI caused by the multi-UE data transmission is minimized, the transmission capacity is expected to be higher. Alternatively, if the MUI caused by the multi-UE data transmission is able to be controlled quantitatively, it is possible to increase the transmission capacity by scheduling overlapping between the multi-UE data.

Figure 4:
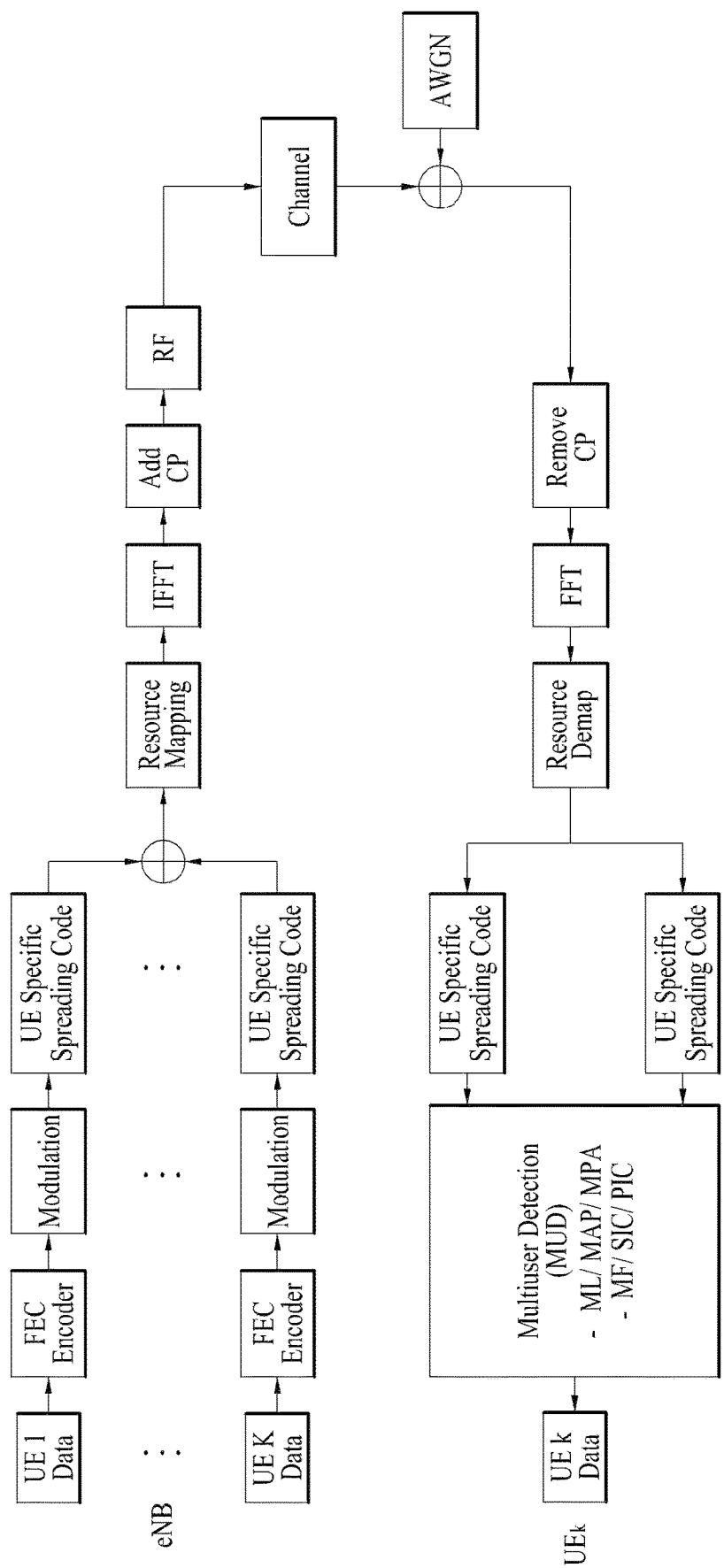
FIG. 4 is a block diagram illustrating downlink transmission/reception of communication devices based on non-orthogonal spreading codes.
Figure 5:
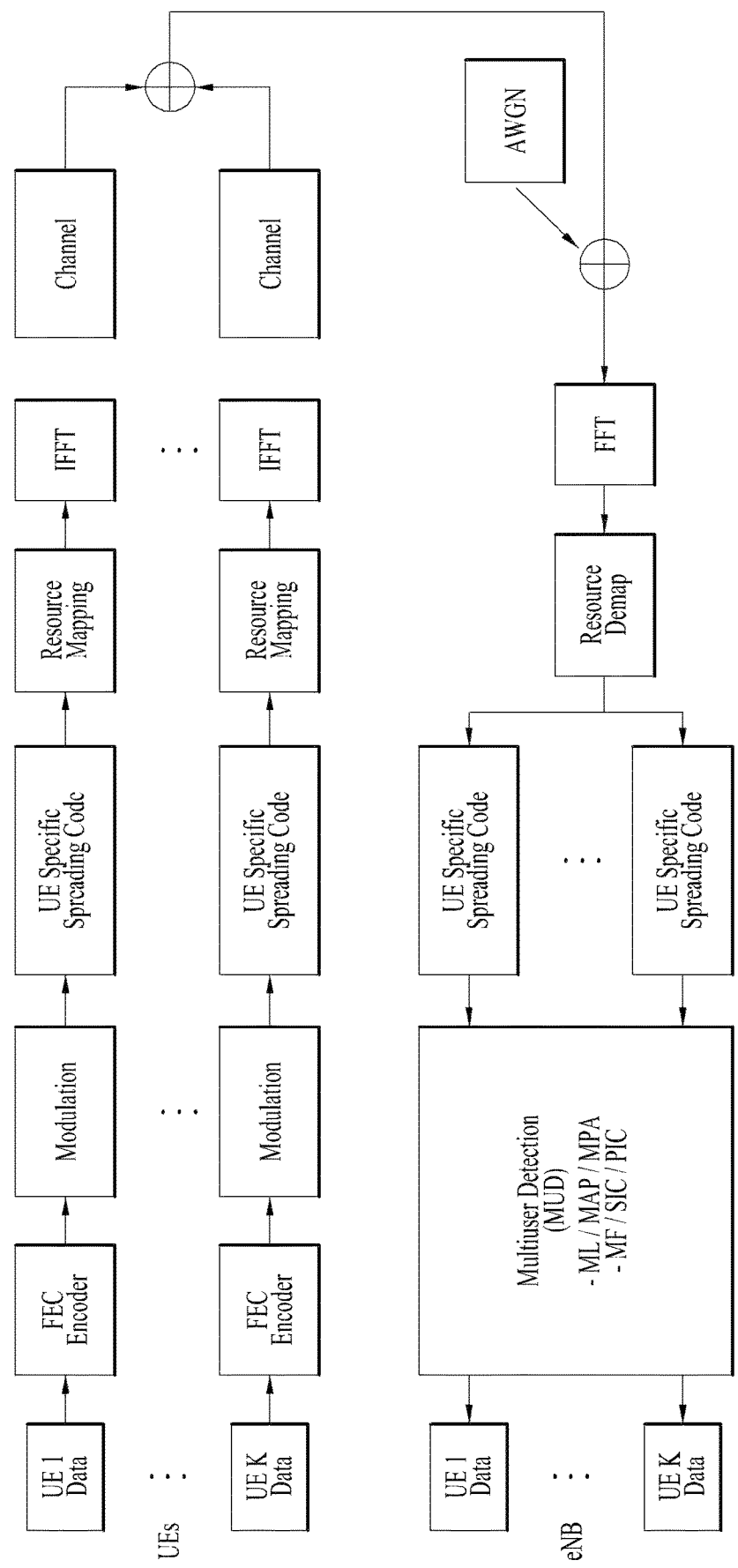
FIG. 5 is a block diagram illustrating uplink transmission/reception of communication devices based on non-orthogonal spreading codes.

FIG. 4 is a block diagram illustrating downlink transmission/reception of communication devices based on non-orthogonal spreading codes, and FIG. 5 is a block diagram illustrating uplink transmission/reception of communication devices based on non-orthogonal spreading codes.

Referring to FIGS. 4 and 5, a non-orthogonal codebook based system (e.g., SCMA, CDMA, etc.) among the NOMA systems may use a multiple access scheme in which non-orthogonal spreading codes are used when multi-UE (or multi-user) data is superposed and transmitted on the same time-frequency resource through spreading.

Specifically, FIG. 4 shows the structures of transmitting and receiving ends for downlink transmission in a NOMA system where multi-UE (or multi-user) data is superposed and transmitted using UE-specific spreading codes when the multi-UE (or multi-user) data is allocated to the same time-frequency resource, and FIG. 5 shows the structures of transmitting and receiving ends for uplink transmission in the same NOMA system. Although FIGS. 4 and 5 shows that the UE-specific spreading codes are used in the frequency domain, the present disclosure is not limited thereto. That is, the UE-specific spreading codes can be also used in the time domain.

Using a predefined codebook, each of transmitting and receiving ends allocates a UE-specific spreading code to each user. In this case, the UE-specific spreading code can be expressed as shown in Equation 3.

$$C = [c^{(1)} \ldots c^{(K)}] = \begin{bmatrix} c_1^{(1)} & \ldots & c_1^{(K)} \\ \vdots & \ddots & \vdots \\ c_N^{(1)} & \ldots & c_N^{(K)} \end{bmatrix} \quad \text{[Equation 3]}$$

A UE-specific spreading codebook may be a codebook satisfying the condition of $C \subset \mathbb{C}^{N \times K}$ and have the characteristics shown in Equation 4.

$$\begin{cases} |c^{(k)*} \cdot c^{(k)}| = 1, \forall k, k = 1, \ldots, K, \\ |c^{(k)*} \cdot c^{(j)}| = \delta_{kj}, \forall k, \forall j, k \neq j, k = 1, \ldots, K, j = 1, \ldots, K \end{cases} \quad \text{[Equation 4]}$$

Figure 6:
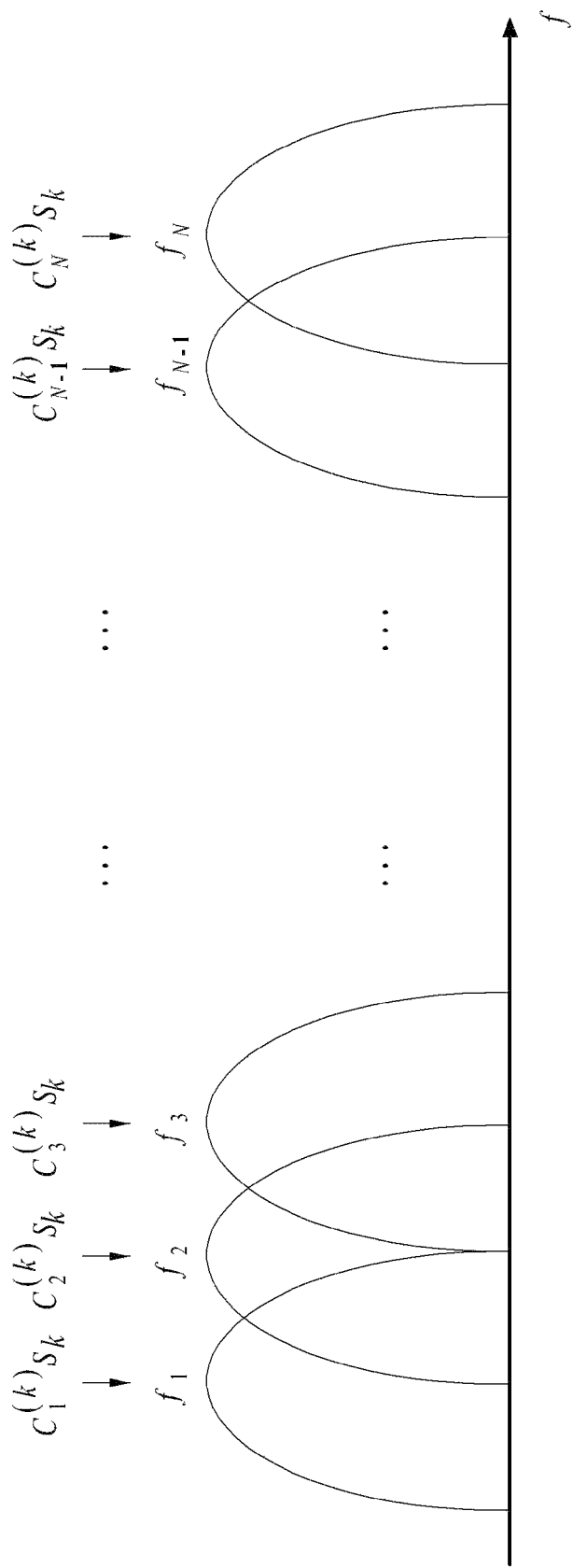
FIG. 6 is a conceptual diagram illustrating data transmission based on UE-specific spreading codes in the frequency domain.

FIG. 6 is a conceptual diagram illustrating data transmission based on UE-specific spreading codes in the frequency domain.

As described above with reference to FIGS. 4 and 5, when multi-UE (or multi-user) information is allocated to the same time-frequency resource, UE-specific spreading codes can be used.

Specifically, FIG. 6 shows the concept of transmission of data for a kth UE (or user) based on a UE-specific spreading code in the frequency domain. If a codebook is predetermined, the data for the kth UE (or user) is multiplied by a codeword corresponding to the kth UE (or user) and then transmitted.

In this case, a data symbol, $s_k$ corresponds to a codeword vector, $c^{(k)}$ with a size of N by 1. N elements of the codeword correspond to N subcarriers, respectively. That is, in FIG. 6, since one data symbol is transmitted over N subcarriers, the time-frequency resource efficiency is reduced to 1/N compared to that of the legacy LTE system. On the other hand, if K or more symbols are superposed and transmitted, the time-frequency resource efficiency increases compared to that of the legacy LTE system. For example, in the case of N<K, if K symbols are superposed and transmitted, the frequency resource efficiency increases by K/N times.

Figure 7:
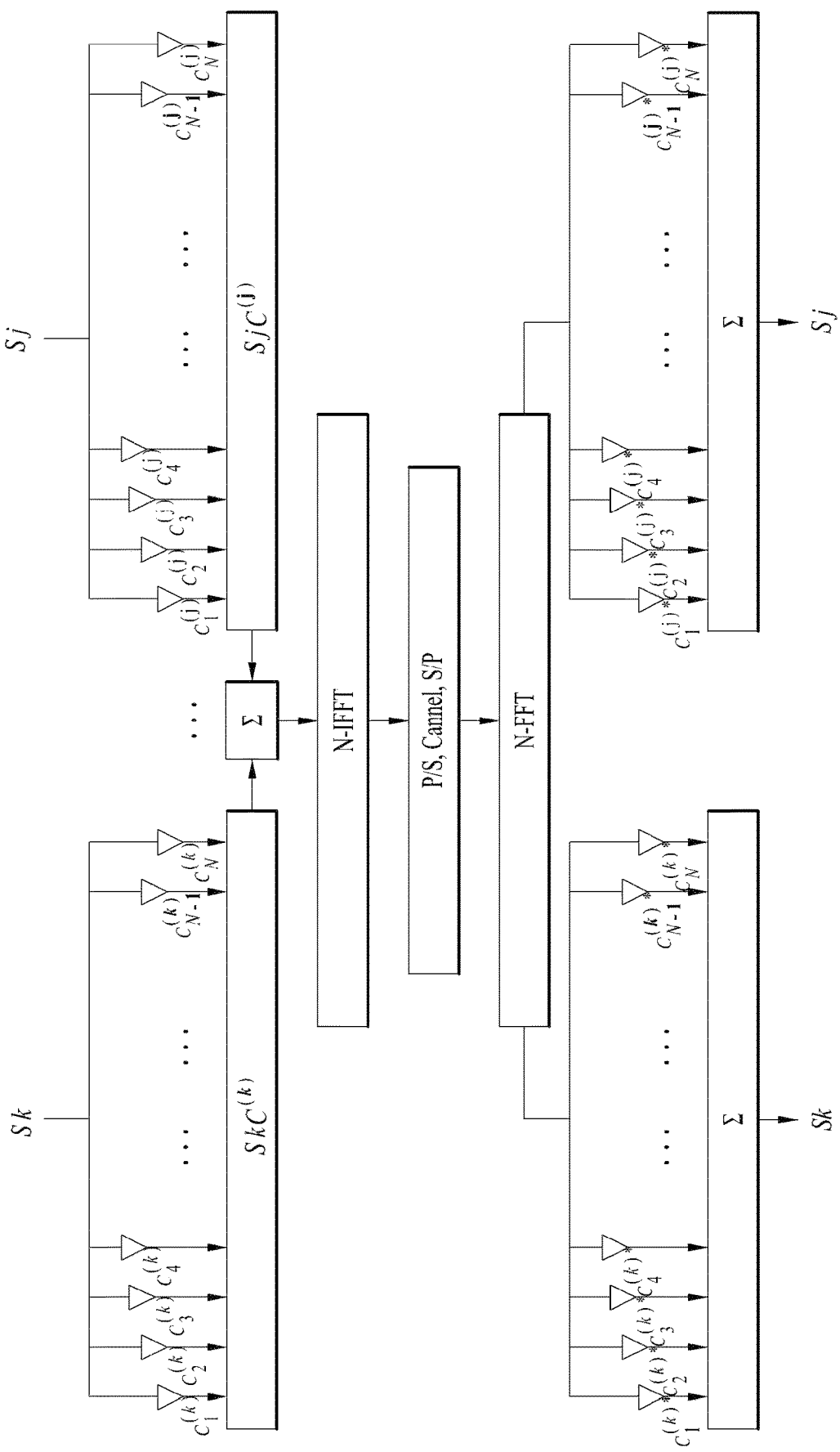
FIG. 7 is a diagram illustrating the basic transmission and reception structure of a non-orthogonal UE-specific spreading code based NOMA system.

FIG. 7 illustrates the basic transmission and reception structure of a non-orthogonal UE-specific spreading code based NOMA system.

Referring to FIG. 7, a transmitting end converts a data symbol for each UE (or user) to a UE-specific spreading code corresponding to each UE (or user) and superposes converted data symbols. The superposed frequency-domain signal with a length of N is converted into a time-domain signal by N-IFFT, and then OFDM transmission is performed. Meanwhile, a receiving end reconstructs the frequency-domain signal using N-FFT. Based on the reconstructed frequency-domain signal, the receiving end decodes the data symbol for each UE (or user) using a conjugate codeword of the UE-specific spreading code corresponding to each UE (or user).

The decoded data symbol, $s_k$ may include MUI depending on the number of superposed users, and MUD can guarantee accurate decoding of $s_k$. In this case, the length of the converted frequency-domain signal may vary depending on predetermined UE-specific spreading codes, and more particularly, it can be less than N. For example, assuming that two frequency-domain signals, which are converted using a UE-specific spreading code with a length of N/2, are concatenated to form a signal with the length of N, it is apparent that the receiving end can decode the signal using the N-FFT.

In the case of downlink, detection performed by a kth UE (or user), that is, a kth receiving end to decode data can be expressed as shown in Equation 5 below.

$$y_k = \sum_{n=1}^{K} H_k c^{(n)} s_n + n_k, \quad \text{[Equation 5]}$$

$$\hat{y}_k = \left[ \frac{[y_k]_j}{[H_k]_{j,j}} \right]_{j=1,\ldots,N} = \sum_{n=1}^{K} c^{(n)} s_n + \hat{n}_k,$$

In Equation 5, $H_k$ is an N by N channel matrix from a kth transmitting end to a receiving end and includes frequency-domain channel coefficients as a diagonal matrix. In addition, $c^{(k)}$ is an N by 1 UE-specific NCC vector for the receiving end at the kth transmitting end, $s_k$ is a data symbol to the kth receiving end, and n is an N by 1 signal noise vector. Moreover, K is the number of multiple UEs allocated to the same time-frequency resource. In this case, $$\left[ \frac{[A]_j}{[B]_{j,j}} \right]_{j=1,\ldots,N}$$

means division of a jth element of vector A by a jth diagonal element of matrix B. If the vector A is a diagonal matrix, the above operation means element division between the two diagonal matrices. If channel compensation is applied to Equation 5, a signal with desired codewords and noise remains. Then, using a conjugate codeword of a UE-specific spreading code, the detection at the receiving end can be expressed as shown in Equation 6.

$$\tilde{y}_k = c^{(k)*} \cdot \hat{y}_k = c^{(k)*} \cdot c^{(k)} s_k + \sum_{n \ne k, n=1}^{K} c^{(k)*} \cdot c^{(n)} s_n + \tilde{n}_k,$$
$$= s_k + \sum_{n \ne k, n=1}^{K} c^{(k)*} \cdot c^{(n)} \cdot s_n + \tilde{n}_k.$$
[Equation 6]

The second term of the last formula in Equation 6 indicates MUI, and it can be cancelled or reduced by MUD.

In the case of uplink, detection performed by a BS, i.e., a receiving end to decode data can be expressed as shown in Equation 7.

$$y = \sum_{n=1}^{K} H_n c^{(n)} s_n + n = H_k c^{(k)} s_k + \sum_{n \ne k, n=1}^{K} H_n c^{(n)} s_n + n_r$$
[Equation 7]

The second term of the third formula in Equation 7 indicates MUI, that is, a multi-UE (or multi-user) interference signal caused by data symbols to other receiving ends. The detection performed by the receiving end to decode data of a kth UE (or user) can be expressed as shown in Equation 8.

$$\hat{y}_k =$$
$$\left[ \frac{[y]_j}{[H_k]_{j,j}} \right]_{j=1,\ldots,N} = c^{(k)} s_k + \sum_{n=1}^{K} \left[ \frac{[H_n]_{j,j}}{[H_k]_{j,j}} \right]_{j=1,\ldots,N} c^{(n)} s_n + \hat{n}.$$
[Equation 8]

If channel compensation for the data of the kth UE (or user) is applied, a signal with desired codewords, MUI, and noise remains. Then, using a conjugate codeword of a UE-specific spreading code, the detection at the receiving end can be expressed as shown in Equation 9.

$$\tilde{y}_k = c^{(k)*} \cdot \hat{y}_k = c^{(k)*} \cdot c^{(k)} s_k + \sum_{n \ne k, n=1}^{K} c^{(k)*} \cdot$$
$$\left[ \frac{[H_n]_{j,j}}{[H_k]_{j,j}} \right]_{j=1,\ldots,N} c^{(n)} s_n + \tilde{n},$$
$$= s_k + \sum_{n \ne k, n=1}^{K} c^{(k)*} \cdot \left[ \frac{[H_n]_{j,j}}{[H_k]_{j,j}} \right]_{j=1,\ldots,N} c^{(n)} \cdot s_n + \tilde{n}.$$
[Equation 9]

The second term of the last formula in Equation 9 indicates MUI, and it can be cancelled or reduced by MUD. In this case, a channel variation in the frequency domain of $$\left[ \frac{[H_n]_{j,j}}{[H_k]_{j,j}} \right]_{j=1,\ldots,N}$$

causes a change in the Euclidian Distance value between UE-specific spreading codes due to different channel environments of multiple UEs (or users).

The above-described NOMA technology can be used together with contention-based transmission in order to reduce latency and overhead caused by uplink grant-based transmission and allow more users to transmit data at the same time. Such a combination is referred to as 'contention-based NOMA'. When UEs transmit data in uplink using a contention-based NOMA scheme, a BS informs the UEs whether their transmission is successful through ACK/NACK signaling. If a UE fails in transmitting data, the UE needs to retransmit the data. In this case, to increase its transmission success rate, the UE should perform the retransmission in a different way from the first transmission. For example, the UE should attempt the retransmission after decreasing the code rate or changing the codeword. That is, an efficient data retransmission method is required to improve the transmission success rate.

Figure 8:
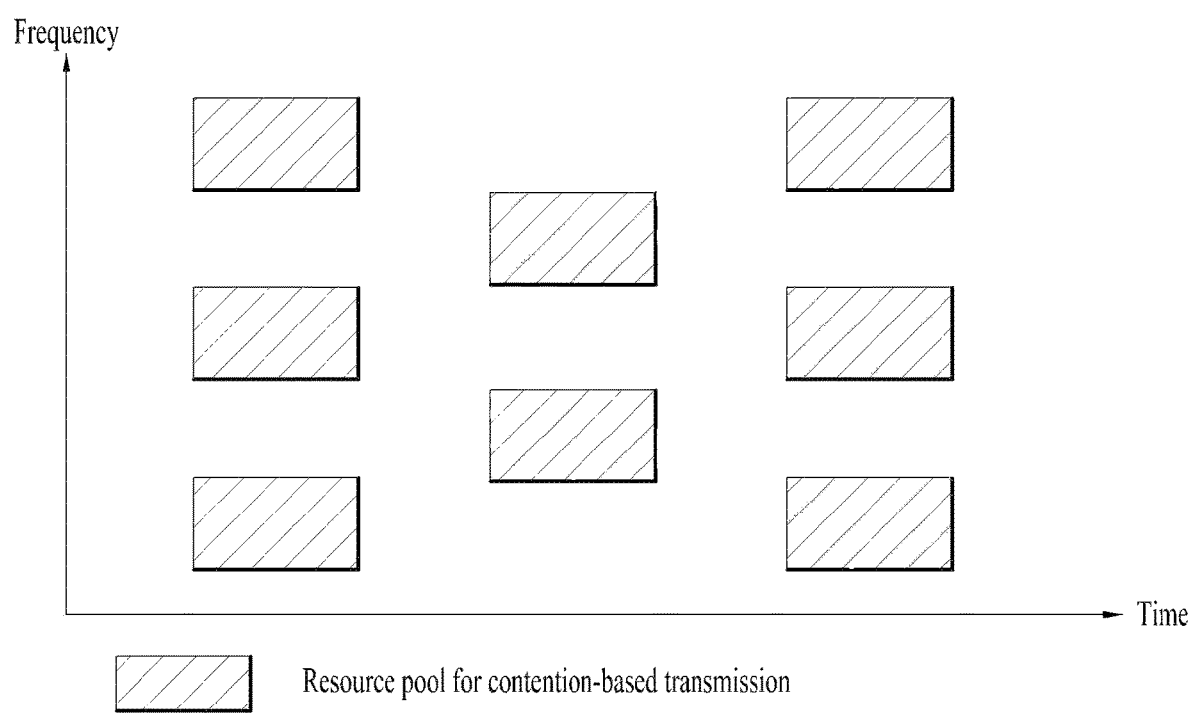
FIG. 8 is a diagram illustrating a resource pool where a UE performs contention-based transmission.

FIG. 8 illustrates a resource pool where a UE performs contention-based transmission.

As described above, a UE can perform uplink transmission based on a contention-based NOMA scheme in order to reduce latency and uplink overhead, and a BS can transmit an ACK/NACK signal to the UE to indicate whether the transmission is successful. In this case, the BS may transmit the ACK/NACK signal through UE-dedicated signaling. That is, the BS may transmit to a specific UE an ACK/NACK signal indicating whether transmission is successful. To this end, when the UE transmits uplink data based on the contention-based NOMA scheme, the UE needs to transmit its ID information together with the data. By doing so, the BS can specify the UE to which the BS needs to transmit the ACK/NACK signal.

Referring to FIG. 8, a resource pool for contention-based NOMA transmission can be defined in the time-frequency domain. Details will be described later.

When a UE transmits data in a resource pool based on the contention-based NOMA scheme, a separate region for UE ID transmission can be allocated within the resource pool. For example, some of Physical Uplink Control Channel (PUCCH) or Physical Uplink Shared Channel (PUSCH) resources may be configured as the region for the UE ID transmission and then used for the UE ID transmission. That is, when UEs perform uplink transmission based on the contention-based NOMA scheme, the BS needs to know UE ID information to obtain information on a UE corresponding to an ACK/NACK signal transmission target. Accordingly, resource allocation therefor can be performed.

To improve the success rate of decoding UE IDs, a signal corresponding to a UE ID may be transmitted at high power or with a low coding rate compared to a data signal. However, increasing the power of the signal corresponding to the UE ID has almost no gain in terms of Signal to Interference Noise Ratio (SINR) in that every UE increases the corresponding signal power and transmits its UE ID in the same region. Thus, a method of effectively increasing the success rate of decoding a UE ID by improving the SINR of a UE ID signal is required. In the following description, resource pool design methods will be explained, considering the above matters.

Referring to FIG. 8, when a UE intends to perform uplink transmission based on the contention-based NOMA scheme, the UE may perform the uplink transmission based on the contention-based NOMA scheme only in a specific time-frequency region. That is, a resource pool may mean a specific region in the time-frequency domain where a UE is configured to perform uplink transmission based on the contention-based NOMA scheme. In this case, there are multiple resource pools, and the multiple resource pools may have the same or different sizes. However, the present disclosure is not limited thereto.

If there is no separate resource pool for the contention-based NOMA scheme and a UE performs uplink transmission by selecting random resources, the UE may collide with another UE that receives an uplink grant in performing data transmission. In this case, the overall system performance may be degraded. Thus, a separate resource pool needs to be configured when the contention-based NOMA scheme is used.

Specifically, the resource pool for the contention-based NOMA scheme can be predefined through common control information. For example, a UE may use the contention-based NOMA scheme in the RRC_CONNECTED state. That is, after establishing downlink synchronization, the UE may receive system information. In this case, information on the resource pool for the contention-based NOMA scheme may be included in the system information, which is transmitted by a BS. After receiving the system information including the information on the contention-based NOMA scheme, the UE can perform uplink transmission based on the contention-based NOMA scheme. In addition, there may be multiple resource pools. Thus, the UE may use a specific one of the multiple resource pools to perform the uplink transmission based on the contention-based NOMA scheme. However, the present disclosure is not limited thereto.

The BS may decode data transmitted in the specific resource pool for the contention-based NOMA scheme. Thereafter, the BS may perform a CRC check on the decoded data to determine whether the decoded data is damaged and then transmit an ACK/NACK signal to a specific UE based on the CRC check result. As described above, since the contention-based NOMA transmission is not grant-based transmission, UE ID information is required. That is, if the BS has no Cell Radio-Network Temporary Identifier (C-RNTI), the BS cannot know which UE transmits which data. Accordingly, when the UE performs the uplink transmission based on the contention-based NOMA scheme, the UE needs to transmit its UE ID in a designated specific region as described above.

As a result, the BS can know which UE transmits which data and thus transmit an ACK/NACK signal in a UE-specific manner. If the UE intends to perform retransmission based on the ACK/NACK signal, the UE may perform grant-based transmission for effective transmission. However, the present disclosure is not limited thereto. That is, a UE performs initial transmission based on the contention-based NOMA scheme. Thereafter, if a BS requests a specific UE to perform retransmission after decoding a UE ID thereof, the BS may specify a resource region for data transmission using scheduling through contention-based transmission where a Scheduling Request (SR) is used.

In addition, when a UE performs uplink transmission based on the contention-based NOMA scheme, the UE may transmit its UE ID by prioritizing the UE ID over data in order to improve the success rate of decoding the UE ID. That is, even though a BS receives the data, the BS may have trouble in performing communication if it does not have information on the UE ID. Thus, the UE ID information may be more important than the data. For this reason, the UE ID may be prioritized over the data. To increase the priority of the UE ID, a signal corresponding to the UE ID may be transmitted at high power or with a low coding rate compared to a data signal. However, since this may be applied to UE IDs of other UEs in the same region, there may be almost no gain in terms of SINR as described above.

Thus, a method of effectively increasing the success rate of decoding a UE ID by improving the SINR of a UE ID signal is required. To this end, a region for UE ID transmission needs to be configured within a resource pool as described above, and details are described in the following.

Figure 10:
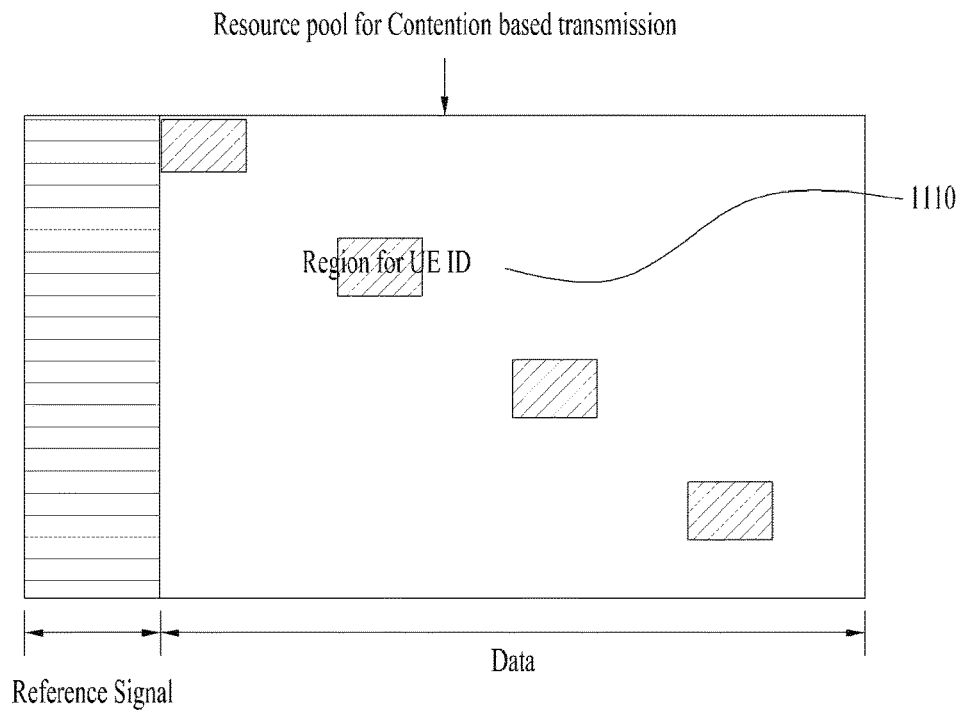
FIG. 10 is a diagram illustrating a method of configuring a resource region for UE ID transmission within a resource pool.

FIGS. 9 and 10 illustrate methods of configuring a resource region for UE ID transmission within a resource pool.

As described above, there may be a separate region for UE ID transmission within a resource region for the contention-based NOMA scheme. For example, FIG. 9(a) shows that a region for a UE ID is allocated along the direction of the time axis. That is, the region for the UE ID may be allocated in parallel to the time axis to a region within a resource pool except a region to which a reference signal is allocated.

As another example, FIG. 9(b) shows that a region for a UE ID is allocated along the direction of the frequency axis. That is, the region for the UE ID may be allocated in parallel to the frequency axis to a region within a resource pool except a region to which a reference signal is allocated.

As a further example, FIG. 9(c) shows that a specific region in the time-frequency domain is allocated as a region for a UE ID. That is, the specific region in the time-frequency domain except a region to which a reference signal is allocated may be used as the region for the UE ID.

Multiple regions may be configured for UE ID allocation, but the present disclosure is not limited thereto. In this case, a UE may transmit its UE ID by selecting one region from among the multiple regions in which UE IDs can be transmitted. In addition, the UE may transmit data in other regions except the selected UE ID region, and a BS can separately decode the UE ID and the data.

Referring to FIG. 10, a UE may transmit its UE ID in a first region 1110, which is one of UE ID allocation regions within a resource pool. In this case, the UE may perform data transmission in the remaining regions, where no UE ID is allocated, among the UE ID allocation regions. When the UE ID is transmitted in the first region 1110, the first region 1110 may be prioritized. That is, the UE may transmit a signal at high power or transmit the UE ID with a low coding rate only in the first region 1110 within the resource pool. In this case, for example, if multiple UEs perform uplink transmission based on the contention-based NOMA scheme, each of the multiple UEs may transmit its UE ID in a region where other UE's UE ID are not allocated among the UE ID regions. As a result, the success rate of decoding UE IDs can be improved, and a BS can transmit a UE-specific ACK/NACK signal as described above. In addition, in the case of retransmission, the UE may perform data transmission in a scheduled specific resource region. In other words, the system can be efficiently managed since the BS is able to recognize the UE that attempts the data transmission.

As another example, a BS may configure a region to which the UE ID of a specific UE is allocated among UE ID allocation regions. In addition, the UE ID allocation regions may be sequentially allocated to UEs according to a predetermined rule. Moreover, the region to which the UE ID is allocated may be selected based on a reference signal. Details will be described later.

As a further example, when a BS transmits control information to UEs, the BS may also transmit information on a resource pool to which the contention-based NOMA scheme is applied and information on how priority is given to a specific region for UE ID transmission. For instance, a UE may be provided with information indicating how the power of a region for transmitting its UE ID is boosted or how the coding rate thereof is reduced compared to a region in which data is transmitted. However, the present disclosure is not limited thereto.

For the contention-based NOMA scheme, a UE ID can be allocated to a specific region within a resource pool and then transmitted, and the UE ID of a specific UE can be allocated to one of a plurality of UE ID allocation regions as described above. In this case, the single region to which the UE ID of the specific UE is allocated among the plurality of UE ID allocation regions may be determined based on a reference signal.

More specifically, referring to FIG. 10, a UE may transmit a reference signal for channel estimation when performing uplink transmission based on the contention-based NOMA scheme. In this case, since the UE receives no grant information from a BS, the UE needs to autonomously select the reference signal. For example, the selection of the reference signal may mean that a signal for estimating a channel for UE's data transmission is selected from three reference signals based on schemes such as: Time Division Multiplexing/Frequency Time Division Multiplexing/Code Division Multiplexing (TDM/FDM/CDM).

For example, in a system that uses a Zadoff-Chu sequence as a Demodulation Reference Signal (DMRS), the number of DMRS sequences that can be used in one contention-based data transmission zone may be determined by a Cyclic Shift (CS) or an Orthogonal Code Cover (OCC). In addition, when a UE performs transmission on multiple layers, a plurality of DMRS sequences may be selected by considering the number of layers. However, the present disclosure is not limited thereto. In this case, a DMRS sequence may be selected by association with a UE's C-RNTI.

Additionally, a UE ID transmission region may be selected by association with a C-RNTI. However, if the C-RNTI is associated, it may be difficult for the BS to check in which region a UE ID is transmitted while performing decoding.

As another example, when uplink transmission is performed based on the contention-based NOMA scheme, a UE ID transmission region may be selected by association with a DMRS sequence. When the number of DMRS sequences is determined, DMRS indices (DMRS_INDEX) may also be determined. In this case, the UE ID transmission region may be determined from DMRS index, and as a result, the BS can check in which region the UE ID is transmitted.

For example, the DMRS indices and the indices of regions where UE IDs are allocated can be defined as shown in Equation 10.

$$\text{Maximum DMRS\_INDEX} \geq \text{Maximum\_UE\_ID\_REGION\_INDEX} \quad \text{[Equation 10]}$$

More specifically, there may be a plurality of regions where UE IDs can be allocated within a resource pool as described above. In this case, by giving indices to the plurality of regions to which the UE IDs can be allocated and comparing the indices with DMRS indices, it is possible to select a region for transmitting a UE ID. At this time, if the maximum number of DMRS indices is equal to or more than the maximum number of UE ID region indices (maximum UE ID REGION INDEX), the DMRS sequences may be mapped N-to-1 or 1-to-1 to the UE ID regions. In this case, for example, a kth UE may select a region for transmitting its UE ID as shown in Equation 11.

$$\text{UE\_ID\_REGION\_INDEX}(k)=\text{mod}(\text{DMRS\_INDEX}(k),\text{Maximum\_UE\_ID\_REGION\_INDEX}) \quad \text{[Equation 11]}$$

In Equation 11, DMRS_INDEX(k) indicates the index of a DMRS sequence used by the kth UE for performing uplink transmission based on the contention-based NOMA scheme, and Maximum_UE_ID_REGION_INDEX indicates the total number of regions where UE IDs can be transmitted. In the case of 1-to-1 mapping, assuming that DMRS_INDEX x, UE_ID_REGION_INDEX is also x.

Meanwhile, in the case of N-to-1 mapping, UE_ID_REGION_INDEX can be determined based on the mod( ) function as shown in Equation 11. For instance, assuming that the number of DMRS sequences is 12 and the number of UE ID regions is 3, UE_ID_REGION_INDEX may be 1 when the DMRS_INDEX is 1, 4, or 7. In this situation, the BS may perform UE ID decoding in a specific region by blind detection of DMRSs.

As another example, the DMRS indices and the indices of regions where UE IDs are allocated can be defined as shown in Equation 12.

$$\text{Maximum DMRS\_INDEX} < \text{Maximum\_UE\_ID\_REGION\_INDEX} \quad \text{[Equation 12]}$$

$$\text{DMRS\_INDEX}=\text{Ceil}(\text{UE\_ID\_REGION\_INDEX}/M) \quad \text{[Equation 13]}$$

$$M=(\text{Maximum\_UE\_ID\_REGION\_INDEX})/(\text{Maximum DMRS\_INDEX}) \quad \text{[Equation 14]}$$

That is, the value of M can be determined by considering the ratio of the maximum UE ID region index to the maximum DMRS index, and the relationship between the DMRS index and the UE ID region index can be defined by a ceiling function.

For instance, it is assumed that the number of DMRS sequences is 3 and the number of UE ID regions is 12. In this case, if the UE uses DMRS index 1, the UE may transmit its UE ID using one of UE ID region indices 1, 4, 7, and 10. In addition, the BS may perform UE ID decoding in a specific region by blind detection of DMRSs. However, the present disclosure is not limited thereto.

Figure 11:
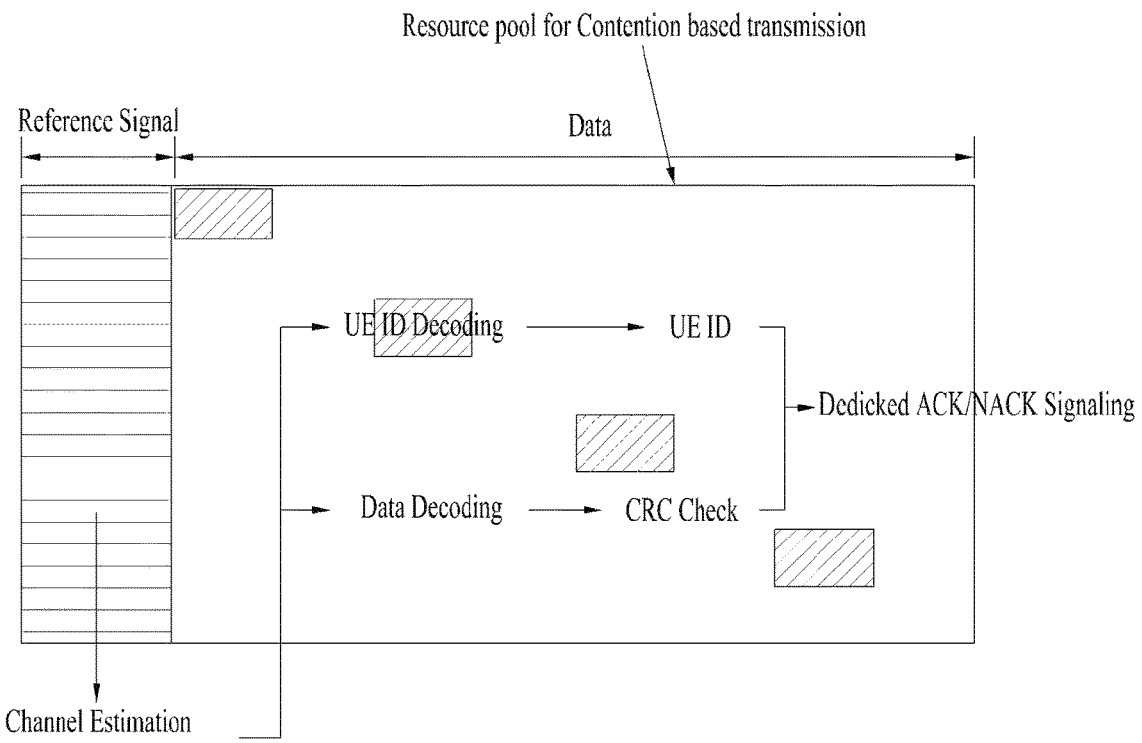
FIG. 11 is a diagram illustrating a method by which a BS transmits an ACK/NACK signal to a specific UE based on UE ID decoding.

FIG. 11 illustrates a method by which a BS transmits an ACK/NACK signal to a specific UE based on UE ID decoding.

As described above, a region in which a UE ID is transmitted may be determined based on a DMRS index. In this case, a BS may perform channel estimation using a DMRS within a resource pool. In addition, the BS may recognize in which UE ID region the UE ID is transmitted from the DMRS index used for the channel estimation. Subsequently, the BS decodes the UE ID using the estimated channel information. Further, the BS decodes data and performs a CRC check to determine whether the decoded data has an error. Thereafter, the BS may transmit an ACK/NACK signal to a specific UE based on the obtained UE ID information.

More specifically, referring to FIG. 11, a BS may perform channel estimation based on a DMRS. In addition, the BS may perform UE ID decoding and data decoding based on the channel estimation value. In this case, a UE ID transmission region may be determined by a DMRS index as described above. After obtaining information on a UE ID from the UE ID decoding, the BS may transmit an ACK/NACK signal to a specific UE based on data error information. However, the present disclosure is not limited thereto.

Figure 12:
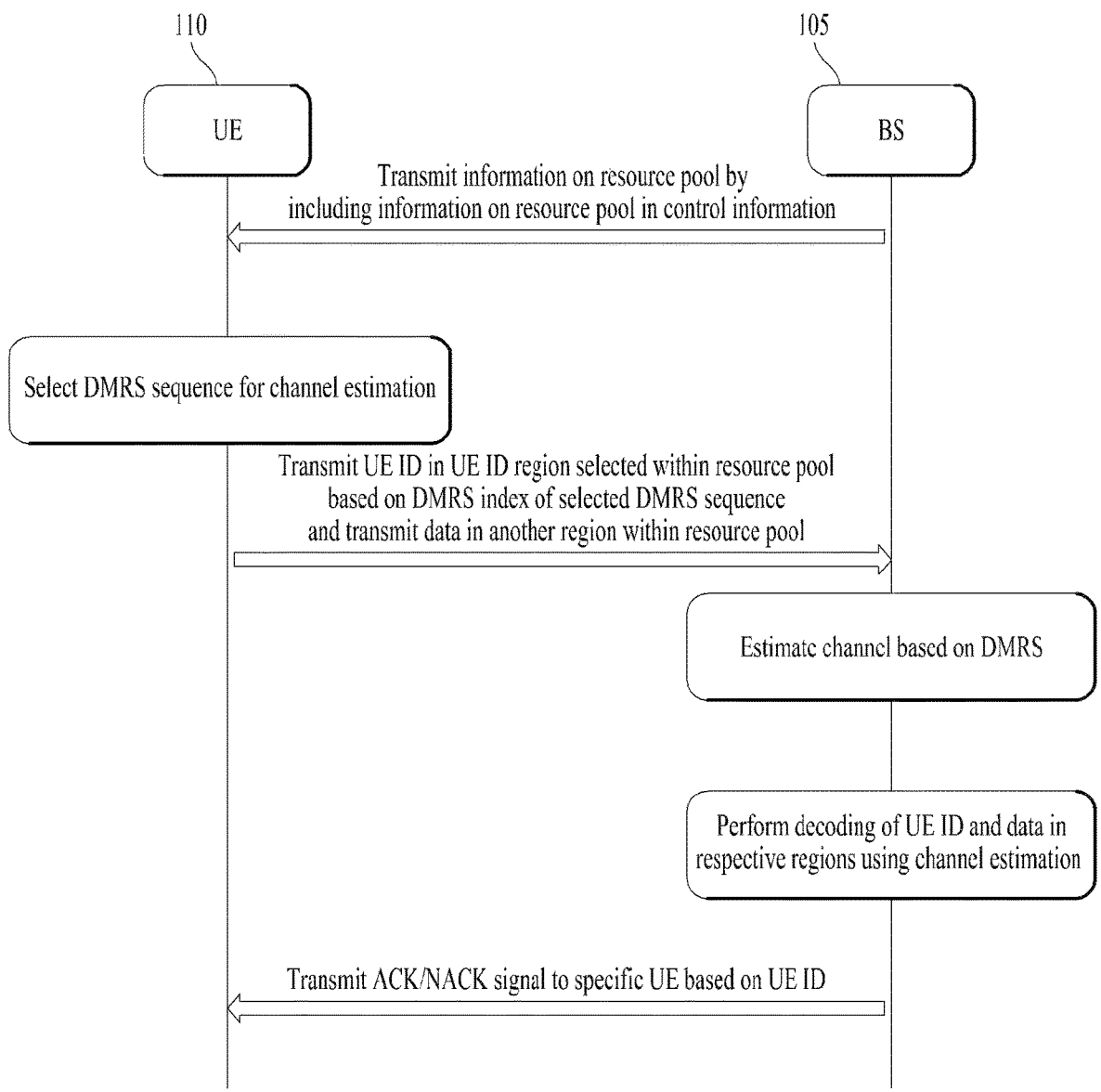
FIG. 12 is a diagram illustrating the flow of signals according to the contention-based NOMA scheme.

FIG. 12 illustrates the flow of signals according to the contention-based NOMA scheme.

A UE 110 can exchange signals with a BS 105. In this case, the UE 110 may be in the RRC_CONNECTED state. That is, the UE 110 may establish downlink synchronization and receive system information. The system information may include control information for communication. If the UE 110 performs uplink transmission based on the contention-based NOMA scheme, the control information received by the UE 110 may include information on a resource pool.

Here, the resource pool means a resource region used by the UE 110 for performing the uplink transmission based on the contention-based NOMA scheme. As described above, a predesignated region may be allocated as the resource pool in order to avoid a collision with a UE performing grant-based uplink transmission.

Thereafter, the UE 110 may select a DMRS sequence for channel estimation. As described above, since the UE 110 does not perform the grant-based uplink transmission, the UE 110 needs to autonomously select the DMRS sequence. The number of DMRS sequences that the UE 110 can select may vary. In this case, DMRS indices may be given based on the number of selectable DMRS sequences. When the UE 110 selects the DMRS sequence for the channel estimation, a region to which a UE ID, which corresponds to ID information on the UE 110, is allocated may be selected according to the index of the selected DMRS sequence. Specifically, the UE ID may be allocated to any one of a plurality of UE ID regions within the resource pool. An index may be given to each of the plurality of UE ID regions. When the DMRS index is determined, the index of the UE ID region may be determined based on the DMRS index. If the number of selectable DMRS sequences is equal to or more than the number of UE ID regions, the UE ID region index may be determined based on Equation 11 above. That is, if the maximum number of DMRS indices is more than the maximum number of UE ID region indices, the UE ID region index may be determined based on Equation 11 above. Thereafter, the UE ID may be allocated to the region corresponding to the determined UE ID index. Meanwhile, when the number of selectable DMRS sequences is less than the number of UE ID regions, the UE ID region index may be determined based on Equations 13 and 14 above.

When the UE ID region to which the UE ID is allocated is determined, the UE 110 may transmit the UE ID in the UE ID region and transmit data in other regions within the resource pool.

Thereafter, the BS 105 may perform the channel estimation based on received DMRS information. The BS 105 may perform UE ID decoding and data decoding in the respective regions based on the channel estimation. In this case, since the UE ID is allocated to the specific UE ID region based on the DMRS index as described above, the BS 105 may perform the UE ID decoding in the specific region. For example, the region to which the UE ID is allocated may have priority over data regions. Thus, the BS 105 may decode the UE ID with a high decoding success rate as described above. Then, the BS 105 may transmit an ACK/NACK signal to the UE 110 designated by the UE ID depending on whether the data transmitted from the UE 110 has an error.

As described above, the BS 105 can transmit the ACK/NACK signal to the specific UE 110 when the contention-based NOMA scheme is applied.

Figure 13:
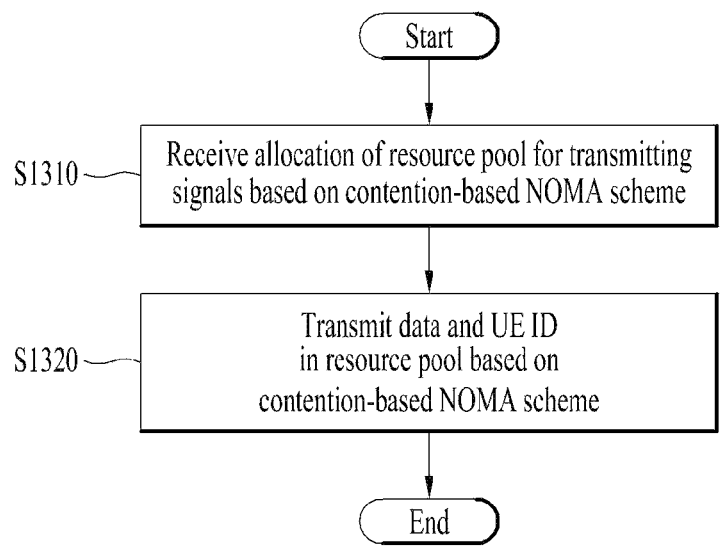
FIG. 13 is a flowchart illustrating a signal transmission method according to the contention-based NOMA scheme.

FIG. 13 is a flowchart of a signal transmission method according to the contention-based NOMA scheme.

A UE can be allocated a resource pool for transmitting signals based on the contention-based NOMA scheme [S1310]. In this case, the UE may receive, as control information, information on the resource pool in the RRC_CONNECTED state as described above with reference to FIGS. 1 to 12. In addition, there may be a region for a UE ID within the resource pool as described above.

Thereafter, the UE can transmit data and the UE ID in the resource pool based on the contention-based NOMA scheme [S1320]. In this case, the UE ID may be allocated to any one of a plurality of UE ID regions, and the UE ID region may be determined based on a DMRS index as described above with reference to FIGS. 1 to 12.

FIG. 14 is a flowchart of a method of configuring a UE ID allocation region based on a DMRS in the contention-based NOMA scheme.

A UE can be allocated a resource pool for transmitting signals based on the contention-based NOMA scheme [S1410]. In this case, the resource pool may be allocated in the same manner as described above with reference to FIGS. 1 to 13.

Next, the UE can select a DMRS sequence [S1420]. In this case, the DMRS sequence needs to be selected for channel estimation as described above with reference to FIGS. 1 to 13. Specifically, since transmission is performed based on the contention-based NOMA scheme, the UE should autonomously select the DMRS sequence.

In this case, a UE ID region to which a UE ID is allocated can be determined based on the number of selectable DMRS sequences [S1430]. If the number of selectable DMRS sequences is equal to or more than the number of UE ID regions, the UE may determine the region to which the UE ID is allocated based on a remainder obtained by dividing a selected DMRS index by the number of UE ID regions [S1440]. That is, the region to which the UE ID is allocated may be determined based on Equation 11 above.

On the contrary, when the number of selectable DMRS sequences is less than the number of UE ID regions, the UE can determine the region to which the UE ID is allocated based on a value obtained by dividing the number of UE ID regions by the number of selectable DMRS sequences and a UE ID region index [S1450]. That is, the region to which the UE ID is allocated may be determined based on Equations 13 and 14 above.

After performing DMRS selection, the UE may select the region to which the UE ID is allocated based on results thereof. In this case, the DMRS selection procedure may be an essential procedure. Specifically, considering that the UE receives no grant since the UE performs uplink transmission based on the contention-based NOMA scheme, the UE should autonomously select the DMRS. In addition, the UE mandatorily use the DMRS for channel estimation in the relationship with the BS. In other words, the UE ID allocation procedure may be an additional procedure for the DMRS procedure, which should be performed in advance. Therefore, the UE may not perform an extra procedure for UE ID allocation, thereby reducing latency and overhead.

Next, the UE can transmit, to the BS, the UE ID and data in the resource pool [S1460]. In this case, the data may be allocated and transmitted to and in other regions where no UE ID is allocated as described above with reference to FIGS. 1 to 13. Thereafter, the BS may perform the channel estimation based on the DMRS and then decode the UE ID and data based on results thereof. The BS can transmit an ACK/NACK to the UE depending on whether the data has an error, and to this end, the BS can use the UE ID [S1470]. In this case, as described above with reference to FIGS. 1 to 13, it is more important to recognize the UE, as a method by which the BS specifies the UE, than to perform the data decoding. In other words, even though the BS decodes the data, the BS cannot transmit the ACK/NACK signal if it does not know a data transmission entity. As a result, communication may not be performed. Therefore, the region to which the UE ID is allocated has a high priority, that is, it can be transmitted at high power or with a low coding rate as described above.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein. Although the present disclosure describes and illustrates the preferred embodiments of the invention, it is apparent that the invention is not limited to these particular embodiments and various modifications and variations can be made by those skilled in the art to which the present invention pertains without departing from the gist of the appended claims. Thus, it is intended that the present invention cover the modifications and variations of this invention provided they come within the scope of the appended claims and their equivalents.

This specification describes both the product invention and method invention, and if necessary, the two inventions can be complementarily interpreted.

INDUSTRIAL APPLICABILITY

The present disclosure can be applied not only to the 3GPP LTE and LTE-A systems but also to various wireless communication systems including IEEE 802.16x and IEEE 802.11x systems. Further, the proposed method can be applied to a communication system using ultra-high frequency bands.

What is claimed is:

1. A method of transmitting a signal by a User Equipment (UE) based on a contention-based Non-Orthogonal Multiple Access (NOMA) scheme in a wireless communication system, the method comprising:
   receiving allocation of a resource pool for transmitting signals based on the contention-based NOMA scheme; and
   transmitting data and a UE ID in the resource pool based on the contention-based NOMA scheme,
   wherein there are a plurality of UE ID regions in the resource pool, and
   wherein the UE ID is allocated to a first region, which is one of the plurality of UE ID regions, and then transmitted.

2. The method of claim 1, wherein the first region to which the UE ID is allocated is determined based on a Demodulation Reference Signal (DMRS).

3. The method of claim 2, wherein the first region to which the UE ID is allocated is determined based on a number of DMRS sequences and a number of the UE ID regions.

4. The method of claim 3, wherein when the number of the DMRS sequences is equal to or greater than the number of the UE ID regions, the first region to which the UE ID is allocated among the plurality of UE ID regions is determined based on a remainder obtained by dividing a selected DMRS index by the number of the UE ID regions.

5. The method of claim 3, wherein when the number of the DMRS sequences is smaller than the number of the UE ID regions, the first region to which the UE ID is allocated among the plurality of UE ID regions is determined based on a value obtained by dividing the number of the UE ID regions by the number of the DMRS sequences and a UE ID region index.

6. The method of claim 1, wherein the first region to which the UE ID is allocated has a higher priority than a region in which the data is transmitted within the resource pool.

7. The method of claim 6, wherein when the first region has the higher priority, the first region is transmitted at higher power than other regions within the resource pool.

8. The method of claim 6, wherein when the first region has the higher priority, the first region is transmitted with a lower coding rate than other regions within the resource pool.

9. The method of claim 1, wherein a certain region to which the UE ID is allocated is determined based on a Cell Radio-Network Temporary Identifier (C-RNTI).

10. The method of claim 1, wherein the plurality of UE ID regions are configured in parallel to a time axis within the resource pool or in parallel to a frequency axis within the resource pool.

11. A User Equipment (UE) for transmitting a signal based on a contention-based Non-Orthogonal Multiple Access (NOMA) scheme in a wireless communication system, the UE comprising:
   a receiving module configured to receive a signal;
   a transmitting module configured to transmit a signal; and
   a processor configured to control the receiving module and the transmitting module,
   wherein the processor is configured to:
   receive allocation of a resource pool for transmitting signals based on the contention-based NOMA scheme; and
   transmit data and a UE ID in the resource pool based on the contention-based NOMA scheme using the transmitting module,
   wherein there are a plurality of UE ID regions in the resource pool, and
   wherein the UE ID is allocated to a first region, which is one of the plurality of UE ID regions, and then transmitted.

12. The UE of claim 11, wherein the first region to which the UE ID is allocated is determined based on a Demodulation Reference Signal (DMRS).

13. The UE of claim 12, wherein the first region to which the UE ID is allocated is determined based on a number of DMRS sequences and a number of the UE ID regions.

14. The UE of claim 13, wherein when the number of the DMRS sequences is equal to or greater than the number of the UE ID regions, the first region to which the UE ID is allocated among the plurality of UE ID regions is determined based on a remainder obtained by dividing a selected DMRS index by the number of the UE ID regions.

15. The UE of claim 13, wherein when the number of the DMRS sequences is smaller than the number of the UE ID regions, the first region to which the UE ID is allocated among the plurality of UE ID regions is determined based on a value obtained by dividing the number of the UE ID regions by the number of the DMRS sequences and a UE ID region index.

* * * * *